United States Patent [19]

Williams

[11] Patent Number: 4,763,381

[45] Date of Patent: Aug. 16, 1988

[54] ACCESSORY USED TO KEEP OUTSIDE REAR VIEW MIRRORS OF VEHICLES CLEAR OF WATER, SNOW, ICE AND DIRT

[76] Inventor: George A. Williams, 2900 Canyon Rd., #45, Ellensburg, Wash. 98926

[21] Appl. No.: 868,773

[22] Filed: May 28, 1986

[51] Int. Cl.$^4$ .............................................. B60S 1/48
[52] U.S. Cl. .............................. 15/250.01; 15/250 B; 15/250.05; 219/219; 350/582
[58] Field of Search ............ 15/250.01, 250 A, 250 B, 15/250.23, 250.05; 350/582; 219/219

[56] References Cited

U.S. PATENT DOCUMENTS

| | | |
|---|---|---|
| 2,913,754 | 11/1959 | Vander Zee . |
| 2,944,277 | 7/1960 | Ochello et al. . |
| 3,135,004 | 6/1964 | Naigraw . |
| 3,522,584 | 8/1970 | Talbot . |
| 3,591,887 | 7/1971 | Keddle . |
| 3,612,647 | 10/1971 | Laprairie . |
| 3,855,661 | 12/1974 | Prince . |
| 3,936,901 | 2/1976 | Theckton . |
| 3,940,822 | 3/1976 | Emerick et al. . |
| 3,968,537 | 7/1976 | Wagenhofer . |
| 4,037,286 | 7/1977 | Medearis et al. . |
| 4,466,712 | 8/1984 | Vitaloni ............................ 15/250 B |
| 4,672,708 | 6/1987 | Williams ............................ 15/250 B |

Primary Examiner—Peter Feldman
Attorney, Agent, or Firm—Roy E. Mattern, Jr.

[57] ABSTRACT

An accessory, via several embodiments, is used to keep vehicle outside rear view mirrors clear of water, snow, ice, and dirt, using many available components mountable on supports of present vehicle outside rear view mirrors. Each accessory installation includes controls located inside a vehicle within convenient reach of a driver. In a preferred accessory embodiment for large trucks, a weatherproof housing is secured to standard supports, and inside is an electrical wiper motor and optionally a mirror washer liquid tank. Electrical circuit leads and liquid conduits extend respectively from the electrical wiper motor and the washer liquid tank into the cab of the truck, where an electrical switch and a liquid valve are located within reach of a driver. Also electrical leads extend from a switch in the cab to the rear of the outside rear view mirrors, where accessory heaters are mounted for use in snow and ice removal. Alternatively, the washer liquid tank and/or a liquid pump are mounted at the rear of each outside rear view mirror. The electrical wiper motor pivotally drives a wiper arm back and forth. An adjacent horizontally spaced wiper arm, not driven, is arranged in a parallelogram configuration for pantograph movements with the driven wiper arm, by having a lower cross arm pivotally secured to both wiper arms. A vertically positioned wiper blade is secured to the cross arm and translates across and back over the outside rectangular surface of the outside rear view mirror.

3 Claims, 4 Drawing Sheets

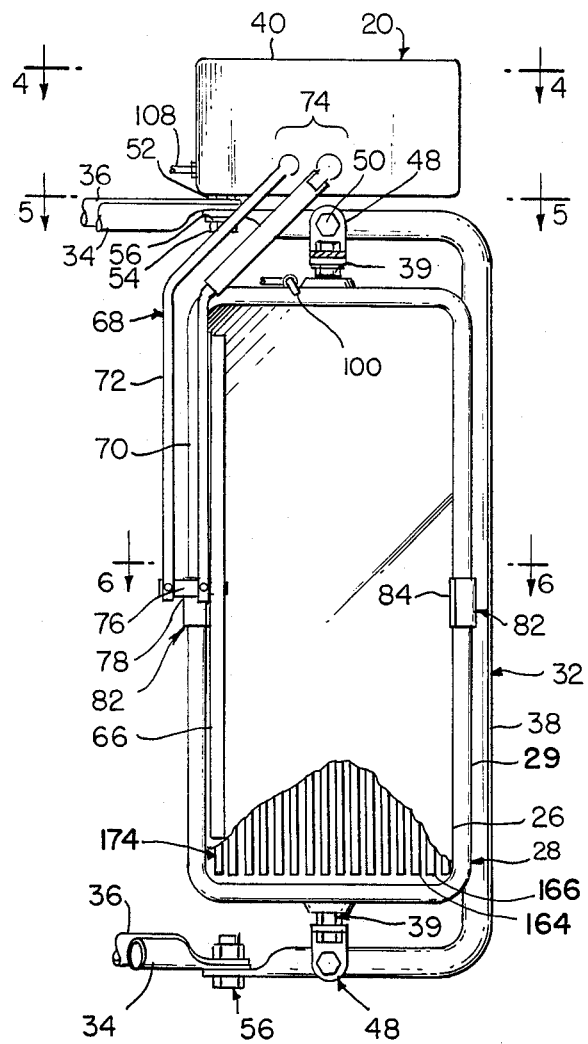
FIG. 3
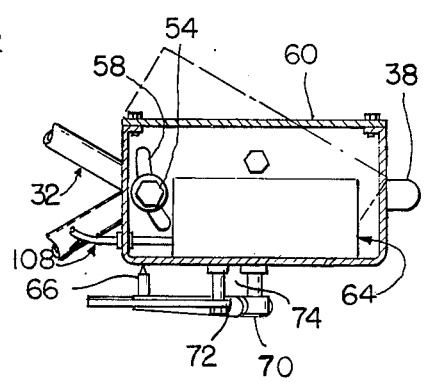
FIG. 4
FIG. 5
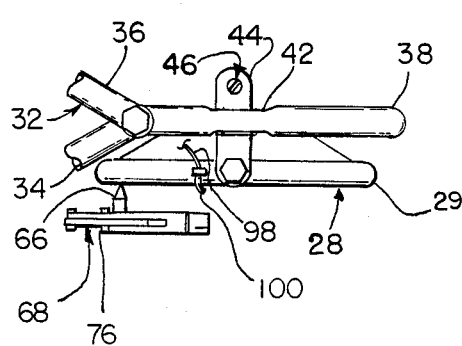
FIG. 6
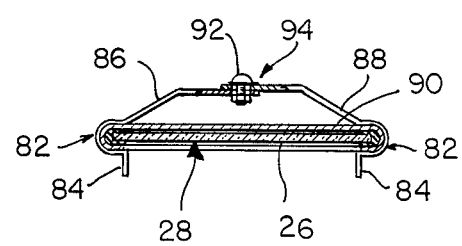

ACCESSORY USED TO KEEP OUTSIDE REAR VIEW MIRRORS OF VEHICLES CLEAR OF WATER, SNOW, ICE AND DIRT

BACKGROUND

Previously several inventors have disclosed in their patents equipment to keep clear outside rear view mirrors on vehicles. For example Christial J. Vander Zee in his U.S. Pat. No. 2,913,754 of 1959 described and illustrated, a mirror wiping blade and mechanism; however, the motion of the wiping blade was not fully controlled. Also Messrs. Ochello in their U.S. Pat. No. 2,944,277 in 1960, illustrated and described their outside half circle shaped rear view mirror equipped with a mirror wiping blade and mechanism.

In 1964, John Naigraw in his U.S. Pat. No. 3,135,004, disclosed a specially shaped outside rear view mirror having a mirror wiping blade, a mirror washer, and a mirror heater. The mirror wiping blade was turned on and off inside the vehicle; however, the mirror washer was finger manipulated at the top of the mirror. Ernest J. Laprairie, in 1971 in his U.S. Pat. No. 3,612,647 in respect to outside vehicle rear view mirrors mounted such a mirror inside of a rotatable transparent cylinder. When this protected cylinder became covered with water, dirt, snow, or ice, it was rotated into a half cylinder frame. This frame contained a water nozzle, a wiper, and a heater, which during the rotation of the transparent cylinder cleared its surface, and consequently made the protected rear view mirror observable by the driver of the vehicle.

In 1974 Lawrence R. Prince in his U.S. Pat. No. 3,855,661 disclosed his automotive outside rear view mirror wiper and washer unit, which he controlled from within the cab of a truck. Diagonal or "V" shaped horizontally extending brackets pivotally supported the top and bottom centers of a rectangular shaped outside rear view mirror.

Carl D. Emerick and Daniel E. Davis in their U.S. Pat. No. 3,940,822 in 1976 illustrated and described their rear view safety mirror, which was equipped with a revolving small wiper blade at the top of a rectangular mirror. Also the housing of this mirror had a heating element for use during ice and snow weather conditions. Both the wiper and heater were controlled inside the vehicle by the driver.

In 1976 John J. Wagenhofer in his U.S. Pat. No. 3,968,537 disclosed his inside controlled outside wipers for the side outside rectangular rear view mirrors of a vehicle. A vertically positioned blade was reciprocated back and forth across the rectangular mirror surface, while it remained vertically positioned.

Messrs. Medearis, Williams, and Medearis in 1977 in their U.S. Pat. No. 4,037,286 illustrated and described their vehicle outside rear view mirror having a horizontal blade, which so remained as it was moved up and down a rectangular mirror. This mirror was heated during freezing weather.

Although these prior inventors have ably indicated, shown, and described how vehicle outside rear view mirrors may be heated, washed and/or wiped, they apparently have not provided equipment to owners or manufacturers of vehicles, which will reliably heat, wash, and wipe the vehicle rectangular mirrors, they presently have on their vehicles, or which are presently being used in manufactured vehicles, and/or in making accessories for vehicle.

SUMMARY

To provide owners of vehicles which require outside rear view mirrors with accessories which heat, wash, and wipe clean these upstanding vertical mirrors, several embodiments of combined units of a heater, washer, pump and/or wiper are now made available to them. In specific reference to the large outside rectangular rear view mirrors mounted on overall diagonal frames on the left and right sides of the driver's cab of large trucks, a weatherproof housing is secured to the top of the overall diagonal frame using the same attachment places already designated in the overall diagonal frame. Only the bolt lengths are changed to accommodate the thickness of the material of this weatherproof housing.

Inside the housing is an electric wiper motor receiving its electrical energy from a circuit, which is connected to the vehicle's electrical circuits. The wiper control switches are located inside the cab within the driver's convenient reach.

The wiper blade is moved, while being kept vertically, horizontally, back and forth across the mirror. To obtain this movement the wiper blade linkage is arranged in a parallelogram configuration, having a wiper motor driven wiper arm spaced apart from a non driven but following pantogram guiding wiper arm. Where these two arms terminate, they are connected together by a horizontal arm, which is pivotally connected to both these arms. It remains horizontal during its transitory movement, and the wiper blade, being firmly secured to this horizontal arm, likewise moves horizontally across the mirror, while remaining in its vertical position. Side stops insure the blade remains in contact with the mirror.

Washing water conduits are extended from the truck's windshield washing water system or an auxiliary system, and a control valve is installed in this system in the truck for convenient manipulation by the truck driver to direct the cleaning water either to the windshield or to the left or right hand outside vehicle rear view mirror.

Heated outside rear view mirrors, if available, are installed, or if not, heating units are installed, and the electrical energy will be derived from the energy source of the vehicle.

From this basic embodiment other embodiments are provided. If a greater reservoir of washer liquid is wanted, such water capacity is provided in a reservoir with a housing and so shaped to be fitted adjacent the back of the rear view mirrors. If a heated mirror is not already mounted on a vehicle, a heater arranged within this housing is fitted to each back of the rear view mirrors.

Throughout all these accessories their designs supplement the currently available vehicle rear view mirrors and their supports, so changes and additions are conveniently and quickly undertaken. Essentially the original vehicle equipment is still used, being only supplemented to provide wiper, heating, and/or washing functions.

DRAWINGS

The accessories, in several embodiments, which are used to keep water, snow, ice and dirt off of the outside rectangular surfaces of outside rear view mirrors of vehicles, are illustrated in the drawings, wherein:

FIG. 3 is a view of the right side outside rear view mirror, shown in FIGS. 1 and 2, as this mirror with the mounted accessories appears to the driver of the cross country truck;

FIG. 4 is a sectional view, taken at line 4—4 in FIG. 3, looking down into the housing accessory to observe the electrical wiper motor and also how the standard connection places of the now in use large truck outside mirrors are utilized in securing this housing accessory, noting further the arcuate slot used in aligning the housing accessory with the standard truck outside mirror;

FIG. 5 is a sectional view, taken at line 5—5 in FIG. 3, looking down on the standard supports of these large truck mirrors, and indicating the addition of an "L" bracket used in supporting the housing accessory;

FIG. 6 is a sectional view taken at line 6—6 in FIG. 3, looking down on the wiper blade guide and stop accessory;

Figures 7, 8:
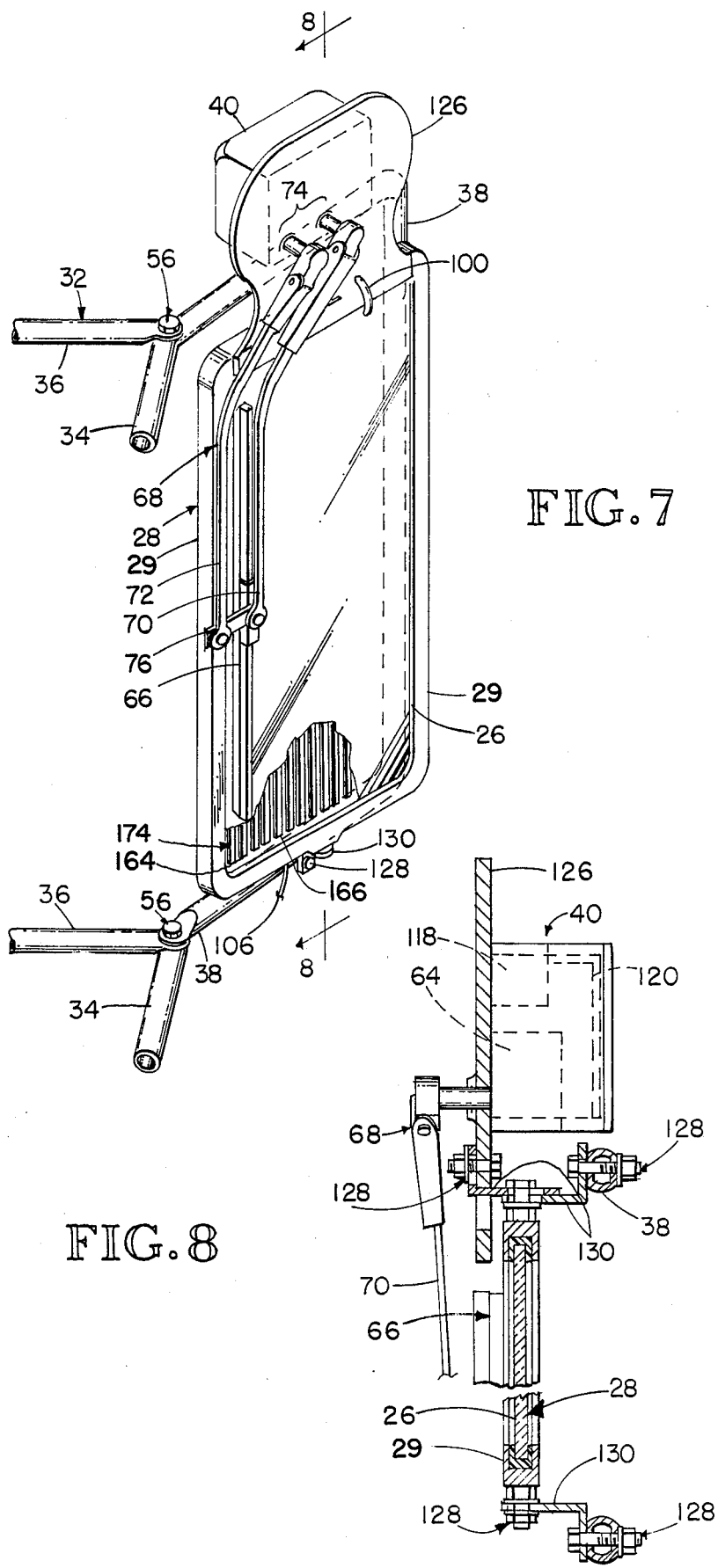
FIG. 7 is a perspective view of the right outside rear view mirror, indicating a different mounting of the accessory housing, which includes both a wiper motor, a washing liquid pump, and a washing liquid tank.
FIG. 8 is a partial side sectional view taken on line 8—8 of FIG. 7, indicating, the accessory housing, which includes a wiper motor, a fluid pump, and a fluid tank.
Figure 9:
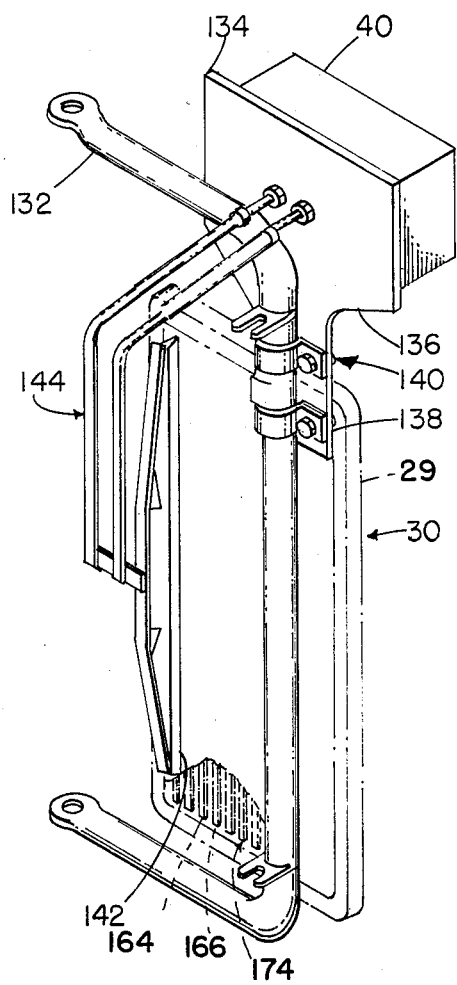
FIG. 9 is a perspective view of a medium sized right outside rear view mirror to be mounted on a smaller truck, bus, or a van on which these accessories are mounted, without hindering the original mounting of this smaller rectangular outside rear view mirror.
Figure 11:
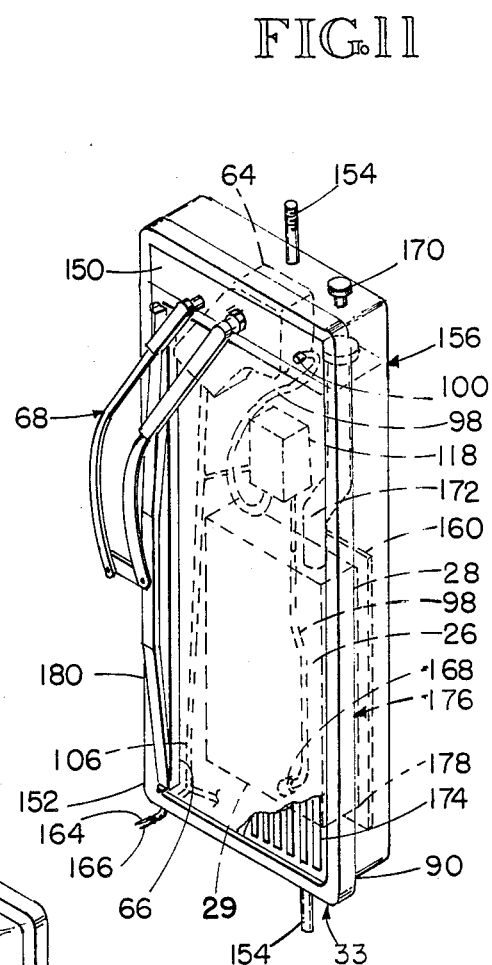
Figure 10:
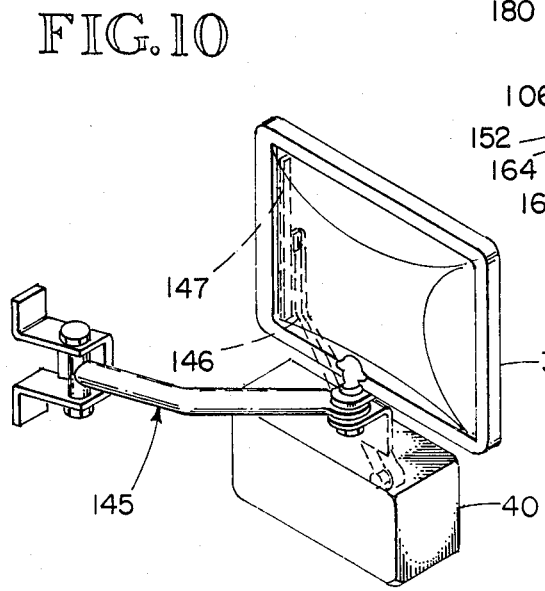

FIG. 10 is a perspective view of a small left outside rear view mirror to be mounted on a smaller truck, bus, van, or larger car; and FIG. 11 is a perspective view with some portions removed to illustrate how the mirrors and the accessories are originally arranged as a complete assembly for subsequent addition of mounting units to fit the various mounting arrangements some of which are shown in FIGS. 7, 9 and 10.

DESCRIPTION OF PREFERRED EMBODIMENTS

Figure 1:
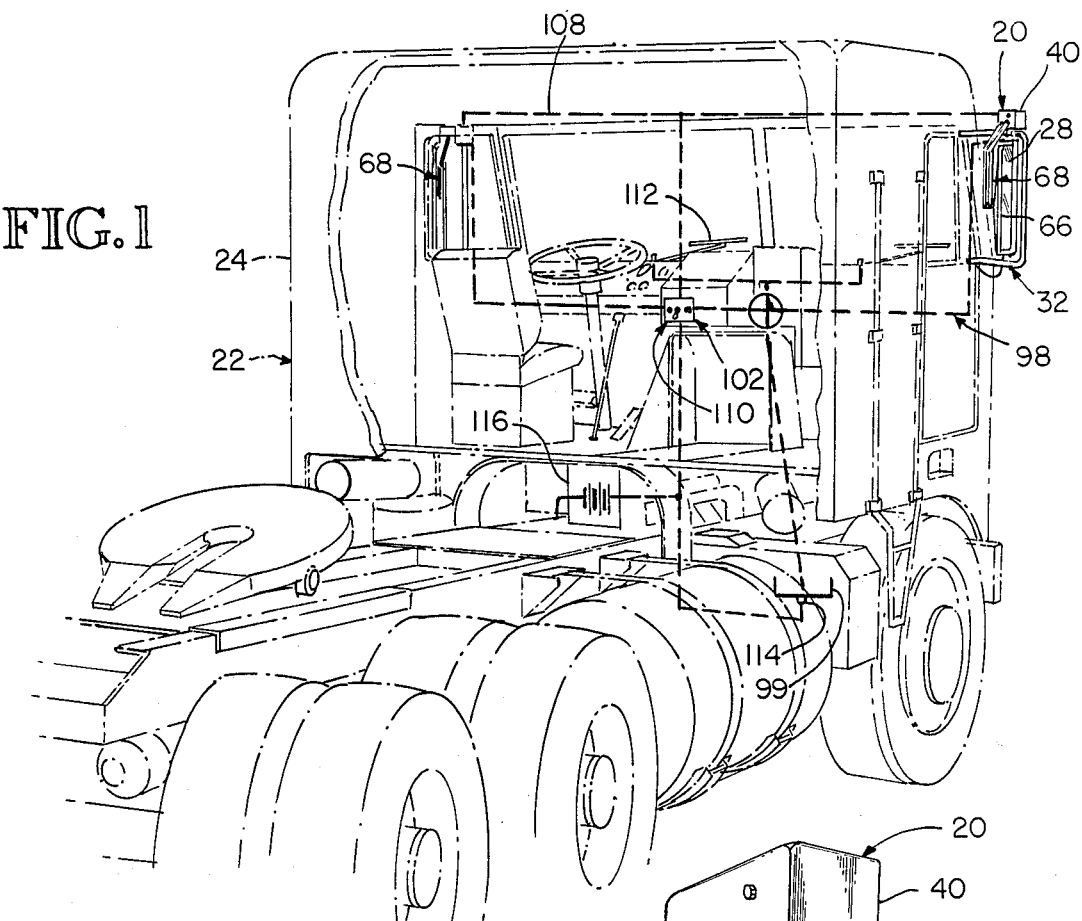
FIG. 1 is a perspective view of a large truck, with portions removed, to indicate how the accessories are rearranged and used to wipe, wash, and/or heat, the outside rear view mirrors, with dash lines indicating both the electrical circuits and liquid conduits of these accessories.
Figure 2:
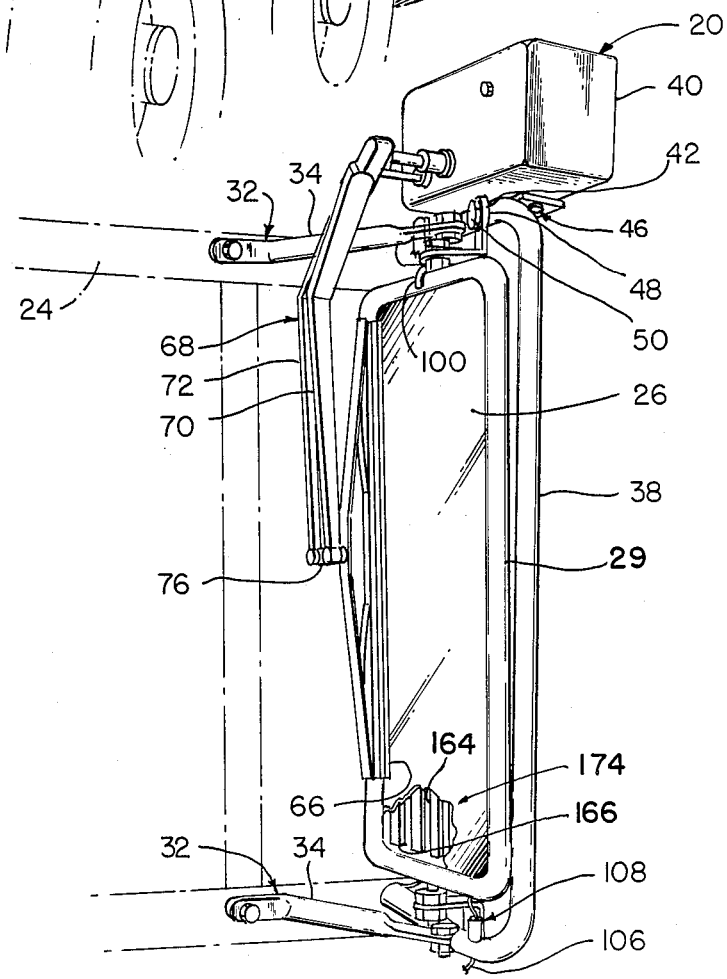
FIG. 2 is a perspective view of the right side outside rear view mirror shown in FIG. 1, with the mounted accessories.

The accessories 20, in several embodiments illustrated throughout the drawings are offered to drivers of large trucks 22 having cabs 24, as shown in FIG. 1, or to drivers of small trucks, buses, and vans, as indicated in FIGS. 9, 10, and 11 for their selection to assist them in keeping the surface 26 of their outside rear view mirrors 28, 30 clear enough, so their vision to the rear, via these mirrors 28, 30, 31, and 33 is not impaired.

Accessories Mounted on Larger Outside Rear View Mirrors

In FIGS. 1 through 8, large standard available rectangular outside rear view mirrors 28, having their major axis vertically positioned, are secured by the standard available mounting support frames 32, which are inclusive of the top and bottom paired diagonal support frame members 34, 36 and the partially encompassing support frame member 38.

To these large standard available mirrors 28, having edge frame members 29 and their support mounting frames 32, and fastener assemblies 39, the selected accessories 20 are principally secured. As shown in FIGS. 1 through 5, a weatherproof housing 40 is secured either to the top or the bottom of frame 38, at two places. One place 42 is the same place where the center of each mirror 28 is attached to the frame 32. An "L" bracket 44 is added plus a new fastener assembly 46, and the original bolt of another original fastener assembly 48 is replaced by a slightly longer bolt 50 which accommodates the added thickness of this "L" bracket 44. At the other or second place 52, where the ends of the diagonal frame members 34, 36 are secured together, another slightly longer bolt 54 is substituted in this original fastener assembly 56 to accommodate the added thickness of the weatherproof housing 40. This housing in turn, as shown in FIG. 4, has an arcuate slot 58 in its bottom 60 to permit the angular positioning of the housing to align the housing with the surface 26 of the mirror 28, before the original fastener assembly 56 is tightened.

The other mirror fastener assemblies 56 remain in their original configuration. In this installation procedure, these accessories 20 are conveniently and quickly installed in reference to trucks already moving on the highways, as well as those new trucks soon to be hauling loads on the highways.

Within the weatherproof housing 40, accessories 20, such as an electrical wiper motor 64 are presecured by a selected fastening method, not shown. The vertical wiper blade 66 is driven and guided back and forth across the surface 26 of the mirror 28 by the parallelogram arrangement 68 of dual wiper arms, one being the driven wiper arm 70, and the other being the pantograph, idler, or non driven wiper arm 72. These wiper arms 70, 72 are horizontally spaced apart at their pivotal tops at a distance 74. Then below, at their moving bottoms, a cross link 76 is pivotally connected to each of these wipers 70, 72, to complete the parallelogram, as the distance 78 between these pivotal connections equals the above distance 74. The cross link 76 is extended sufficiently to non pivotally receive and secure the vertical wiper blade 66 at its mid length, so the parallelogram arrangement 68 insures the back and forth movement of the vertical wiper blade 66 across the surface 26 of the mirror 28.

When necessary, a wiper blade guide-stop accessory 82 is installed as shown in FIGS. 3 and 6. Vertical guide-stops 84 are positioned by their respective mirror edge positioning arms 86, 88, which are overlapped at the back 90 of the mirror 28 and secured by a fastener 92, utilizing their threaded portions 94.

In FIGS. 1, 2, 3, 5, and 8, washer liquid conduit 98 is illustrated, which commences at a washing liquid tank 99 which terminates at spray nozzles 100. The valving unit 102 which controls the liquid flow is installed in the cab 24 of the truck 22 and includes a selector of several valve positions. Preferably one valve position directs washing liquid to the truck windshield. Another valve position directs washing liquid to the left outside rear view mirror. Then another valve position directs washing liquid to the right outside rear view mirror.

Also as shown in FIGS. 1, 2, 3, and 4, electrical conductors 106 of a circuit 108, inclusive of a switching unit 110 mounted in the cab 24 of a truck 22, serve to control the operations of the windshield wipers 112, the outside rear view mirror wipers 66, and the electrically operated washer fluid pump 114 or pumps 114. The electrical energy is derived from the battery 116 of the truck 22.

As illustrated in FIGS. 7 and 8, the weatherproof housing 40 includes the electrical wiper motor 64, a washing liquid pump 118 and a washing liquid tank 120. These latter two accessories serve to supplement the capacities of the washer liquid pump 114 of the truck 22 and the washer liquid tank 99 of the truck 22.

The housing 40 is secured to the curved vertical mounting plate 126, by a selected fastening assembly, not shown, and the curved vertical mounting plate 126, in turn is secured with the fastening assembly 128 inclusive of an "L" bracket 130, like one which secures the mirror 28 in place.

As shown in FIGS. 2, 3, 7 and 9, the mirror surfaces 26 are heated by the electrical heaters 174 as they receive electrical energy via the electrical conductors 164, 166.

Accessories Mounted on Smaller Outside Rear View Mirrors

The same approach to providing these accessories to the driver of a large truck 22 is used in providing them to a driver of a smaller truck, bus, or van on which smaller mirrors 30 are installed. In FIG. 9, a smaller mirror 30 is shown supported by a "C" support shaped frame 132. A vertical mounting plate 134 having a depending stem portion 136 is secured by half round brackets 138 and fastener assemblies 140 to position the stem portion 136 at a selected height along the "C" frame 132. This position is determined by properly placing the smaller wiper blade 142 in respect to the surface 26 of this smaller mirror 30. The parallelogram arrangement 144 is smaller than the parallelogram arrangement 68. However, the overall functioning remains the same as it did in conjunction with wiping the surface 26 of the larger mirror 30.

An even smaller outside rear view mirror 31 is shown in FIG. 10 in respect to the left outside rear view mirror to be mounted on a smaller truck, bus, van, or larger car, via bracket assembly 145. The even smaller parallelogram arrangement 146, with an even smaller wiper 147 continues on in the same overall functioning performance described previously.

A More Complete Accessory Serving Essentially as a Complete Replacement Unit or as Original Equipment In FIG. 11, an almost self contained mirror accessory 33, which also serves as original equipment 33 is illustrated. At the top of the mirror, such as the larger mirror 28, above the mirror surface 26, a wiper motor mounting face plate 150 is positioned. Then at the bottom of this mirror 28, a mounting plate 152 is positioned. Each of these mounting plates 150, 152 are made stronger to receive centered mounting studs 154, which are used in mounting this self contained mirror accessory 33, to various types of mirror brackets. The top plate 150 also serves to firmly support the electrical wiper motor 64, and in turn the parallelogram arrangement 68 with the wiper blade 66.

Secured between these stronger mounting plates 150, 152, is an encompassing spaced support housing 156 to position a reservoir 158 for mirror washing liquid having its mounting plate 160, and to position a pump 118. This pump 118 is electrically driven, receiving the electrical energy from the circuit wires 164, 166 of electrical conductor 106, also serving to deliver electrical energy to the electrical wiper motor 64. When this pump 118 is operated, via controls, not shown, which are mounted within reach of the driver, the mirror washing liquid is drawn through the filter 168, up through the conduit 98, into the pump 118, through the conduit 98, to the spray nozzle 100. The reservoir 158 is filled, after removing cap 170, by pouring the liquid down into the entry tube 172.

Electrical heating units 174 are positioned on the back 90 of the mirror surface 26. They also receive their electrical energy from circuit wires 164, 166.

During manufacturing of this essentially self contained mirror accessory 33, after the wiper motor 64 has been secured with selected conventional fasteners, not shown, and after the liquid pump 118, and the reservoir 158 with its plate 160, have been secured to the encompassing spaced support housing 156, with selected conventional fasteners, not shown, then a two piece telescoping clamping frame 176 is ready to be installed.

Its respective pieces 178, 180 are transversely positioned together, and are arranged to be secured by selected conventional fasteners, not shown. Portions of the mounting plates 150, 152, and portions of the support housing 156, along with the mirror 28, and an included seal, not shown, which is placed inside the clamping frame 176, are all likewise positioned to be held together, to become this completed mirror 33, as this two piece telescoping clamping frame 176 is positioned and secured.

Utilization of Standard Available Components

These accessories, whenever possible, are derived from standard available components. The additional accessory components are designed for convenient manufacture and installation. The overall purpose is to provide all these accessories, so the drivers of all such vehicles, utilizing outside rear view mirrors, may readily acquire and install them in any selected embodiment, and thereafter undertake their driving knowing their observations as to what is occurring behind their vehicle, on either side, will not be impaired by mirror surfaces which have not been kept sufficiently clear.

I claim:

1. A vehicle outside rear view mirror accessory adapted to be installed and to be used to keep left or right outside rear view mirrors of vehicles clear of water, snow, ice and dirt with two such said accessories generally being used, one for each mirror, located on the respective left and right side of the vehicle comprising:
   (a) a weatherproof housing adapted to be secured to the supports, provided by the vehicle manufacturer, to support rectangular outside rear view mirror, provided by the vehicle manufacturer, without changing locations of fasteners, as determined by the vehicle manufacturer;
   (b) an electric wiper motor secured inside said weatherproof housing;
   (c) a mirror surface wiper assembly pivotally secured to the electric wiper motor, after passing through the weatherproof housing, comprising in turn:
      (i) a first pivotal wiper arm directly driven by the electric wiper motor;
      (ii) a second pivotal wiper arm, not directly driven by the electric wiper motor, and horizontally spaced, where pivotally secured, apart from the pivotal securement place of the driven first pivotal wiper arm;
- (iii) a lower horizontal cross link pivotally secured to these repective first and second pivotal wiper arms, having a horizontal length matching the horizontal space located above between the securement places of the respective first and second pivotal wiper arms; and
- (iv) a vertically positioned wiper blade secured to the lower horizontal cross link to be moved back and forth horizontally across a rectangular mirror surface of a rectangular outside rear view mirror of a vehicle, provided by the vehicle manufacturer;
- (d) an electrical heating assembly adapted to be positioned adjacent to a rectangular outside rear view mirror of a vehicle, provided by the vehicle manufacturer, to heat a mirror surface;
- (e) a washing liquid nozzle assembly adapted to be positioned adjacent a rectangular outside rear view mirror of a vehicle, provided by the vehicle manufacturer, having a nozzle to spray washing liquid on a mirror surface;
- (f) an electrical circuit assembly adapted to be interconnected with an electrical circuit of a vehicle to distribute electrical energy to the electric wiper motor and to the electrical heating assembly, and having selectable switches adapted to be positioned on a vehicle within the reach of a seated driver of a vehicle, to turn on and off the distribution of electrical energy, repectively, to respective left and right electrical wiper motors, and respective left and right electrical heating assemblies, adapted to be located at respective left and right outside rear view mirrors of a vehicle, provided by the vehicle manufacturer;
- (g) a washing liquid conduit assembly adapted to be interconnected with a washing liquid conduit assembly of a vehicle, provided by the vehicle manufacturer, to distribute washing liquid to respective washing liquid nozzle assemblies, and having selectable valves, adapted to be positioned on a vehicle within the reach of a seated driver of a vehicle, to turn on and off the distribution of washing fluid to respective left and right liquid conduit assemblies, located at respective left and right vehicle outside rear view mirrors, provided by the vehicle manufacturer; and
- (h) a washing liquid tank and a liquid pump secured within the weatherproof housing, and interconnected with the washing liquid conduit assembly, to supplement the storage and distribution of the washing liquid to respective outside rear view mirrors, provided by the vehicle manufacturer.

2. A vehicle outside rear view mirror accessory, as claimed in claim 1, comprising a mounting assembly to be secured to the supports, provided by the vehicle manufacturer, to support rectangular outside rear view mirrors, provided by the vehicle manufacturer, without changing locations of fasteners, as determined by the vehicle manufacturers, and then in turn have this mounting assembly securably receive the weatherproof housing, the electrical heating assembly, the washing nozzle assembly, and selected portions of both the electrical circuit assembly and the washing liquid conduit assembly.

3. A vehicle outside rear view mirror combination adapted to be installed and to be used, so the resulting left or right outside rear view mirrors of vehicles will be kept clear of water, snow, ice, and dirt, with two such said combinations generally being used on a vehicle, so there is one combination on the respective left side of a vehicle, and another combination on the respective right side of a vehicle, comprising:
- (a) a mirror and its frame;
- (b) a wiper motor mounting plate positioned at the top of the mirror and its frame;
- (c) a bottom mounting plate positioned at the bottom of the mirror and its frame;
- (d) an encompassing spaced support housing secured between the wiper motor mounting plate and the bottom mounting plate and contacting the mirror and its frame creating an enclosed receiving space behind the mirror;
- (e) a washing liquid reservoir secured to said support housing, and positioned behind the mirror, within the enclosed receiving space, to receive and to dispense mirror washing liquid;
- (f) a washing fluid pump secured to said support housing, and positioned behind the mirror, within the enclosed receiving space, to pump mirror washing liquid from the washing liquid reservoir for spraying on the mirror;
- (g) electrical heating units positioned along the back of the mirror;
- (h) a surrounding clamping frame to hold together the assembly of: the mirror and its frame, the wiper motor mounting plate, the bottom mounting plate, and the encompassing spaced support housing;
- (i) liquid conduits, essentially completely arranged in the enclosed receiving space behind the mirror, to receive mirror washer liquid for filling the reservoir, to convey washer liquid from the bottom of the washer liquid reservoir to the washer liquid pump, and to direct washer liquid from the washer liquid pump to a washer liquid sprayer;
- (j) a washer liquid sprayer secured to the wiper motor mounting plate to receive the washer liquid coming from the washer liquid pump and direct it to the mirror surface;
- (k) an electrical wiper motor secured to the wiper motor mounting plate and positioned in the enclosed receiving space behind the mirror;
- (l) electrical conduits to receive vehicle battery electrical energy and to distribute this electrical energy to: the electrical wiper motor, the electrical heating units, and to the washer liquid pump,
- (m) a mirror surface wiper assembly pivotally secured to the electric wiper motor, comprising in turn:
  - (i) a first pivotal wiper arm directly driven by the electric wiper motor;
  - (ii) a second pivotal wiper arm, not directly driven by the electric wiper motor, and horizontally spaced apart, where it is pivotally secured to the electric wiper motor, from the pivotal securement place of the driven first pivotal wiper arm;
  - (iii) a lower horizontal cross link pivotally secured to these respective first and second pivotal wiper arms, having a horizontal length matching the horizontal space, located above, between the pivotal securement places of the respective first and second pivotal wiper arms; and
  - (iv) a vertically positioned wiper blade, secured to the lower horizontal cross link, to be moved back and forth horizontally across a rectangular mirror surface of a rectangular outside rear view mirror of a vehicle; and (n) fastener components respectively extending from the wiper motor mounting plate at the top, and the bottom mounting plate at the bottom, to be used in mounting this vehicle outside rear view mirror combination to the mirror mounting brackets of a vehicle.

* * * * *